United States Patent
Shahrier

(10) Patent No.: US 7,974,294 B2
(45) Date of Patent: Jul. 5, 2011

(54) SYSTEM FOR CONTEXT TRANSFER FOR WIRELESS INTERNET DEVICES

(75) Inventor: Sharif M. Shahrier, Lake Mary, FL (US)

(73) Assignee: InterDigital Technology Corporation, Wilmington, DE (US)

( * ) Notice: Subject to any disclaimer, the term of this patent is extended or adjusted under 35 U.S.C. 154(b) by 1447 days.

(21) Appl. No.: 10/317,769

(22) Filed: Dec. 12, 2002
(Under 37 CFR 1.47)

(65) Prior Publication Data

US 2003/0214922 A1 Nov. 20, 2003

Related U.S. Application Data

(60) Provisional application No. 60/340,417, filed on Dec. 14, 2001.

(51) Int. Cl.
*H04L 12/28* (2006.01)

(52) U.S. Cl. .......................... 370/401; 370/331

(58) Field of Classification Search ........................ None
See application file for complete search history.

(56) References Cited

U.S. PATENT DOCUMENTS

| | | | |
|---|---|---|---|
| 5,903,559 A | 5/1999 | Acharya et al. | |
| 6,320,873 B1 | 11/2001 | Nevo et al. | |
| 7,050,793 B1 * | 5/2006 | Kenward et al. | 455/414.4 |
| 7,171,206 B2 * | 1/2007 | Wu | 455/438 |
| 7,283,496 B2 * | 10/2007 | Gurivireddy et al. | 370/331 |
| 2003/0076814 A1 * | 4/2003 | Gurivireddy et al. | 370/352 |
| 2003/0103496 A1 * | 6/2003 | Lakshmi Narayanan et al. | 370/352 |
| 2004/0196808 A1 * | 10/2004 | Chaskar et al. | 370/331 |
| 2005/0105491 A1 * | 5/2005 | Chaskar et al. | 370/331 |

OTHER PUBLICATIONS

Digital cellular telecommunications system (Phase 2) (GSM); Universal Mobile Telecommunications System (UMTS); General Packet Radio Service (GPRS) Service Description; Stage 2 (3GPP TS 23.060 version 4.2.0 Release 4); ETSI TS 123 060, ETSI Standards. European Standards Institute, vol. 3-SA2, No. V420, (Oct. 2001), XP014007563.

Third Generation Partnership Project, "Technical Specification Group Services and Systems Aspects; General Packet Radio Service (GPRS); Service Description; State 2 (Release 4)," 3GPP TS 23.060 V4.6.0 (Sep. 2002).

* cited by examiner

*Primary Examiner* — Duc C Ho
(74) *Attorney, Agent, or Firm* — Volpe and Koenig, P.C.

(57) ABSTRACT

A system and method for feature context transfer store all currently "active" feature contexts locally at an Access Router (AR), and store all "inactive" feature contexts centrally in a main database. The main database can be accessed by all the ARs within the same administrative domain. When a new microflow becomes active, its active feature contexts are brought from the main database and loaded into the local directory, thus replacing any inactive feature contexts that are not needed at the time.

6 Claims, 3 Drawing Sheets

| TYPE | CODE | CHECKSUM |
|---|---|---|
| IDENTIFIER || SEQUENCE NUMBER |
| NUM ADDRS | ADDR ENTRY SIZE | LIFETIME |
| MN'S IDENTITY (NAI OR L2 ADDRESS) |||
| oldAR'S IP ADDRESS |||
| newAR'S IP ADDRESS [1] |||
| PREFERENCE LEVEL [1] |||
| newAR'S IP ADDRESS [2] |||
| PREFERENCE LEVEL [2] |||
| . . . |||

| TYPE | CODE | CHECKSUM |
|---|---|---|
| IDENTIFIER | | SEQUENCE NUMBER |
| MN'S IDENTITY (NAI OR L2 ADDRESS) | | |

| TYPE | CODE | CHECKSUM |
|---|---|---|
| IDENTIFIER | | SEQUENCE NUMBER |
| MN'S ADDRESS (OPTIONAL) | | |

| TYPE | CODE | RES | L | SEQUENCE NUMBER |
|---|---|---|---|---|
| NUM PARAMS | LIFETIME | | | CHECKSUM |
| MN'S IDENTITY | | | | |
| PARAMETER | | | | |
| PARAMETER | | | | |
| . . . . . . . . . | | | | |

| IP HEADER |
|---|
| ESP HEADER |
| TCP HEADER |
| ICMP OR CT HEADER |
| FEATURE CONTEXT OBJECTS (OPTIONAL) |
| AUTHENTICATION FIELD |

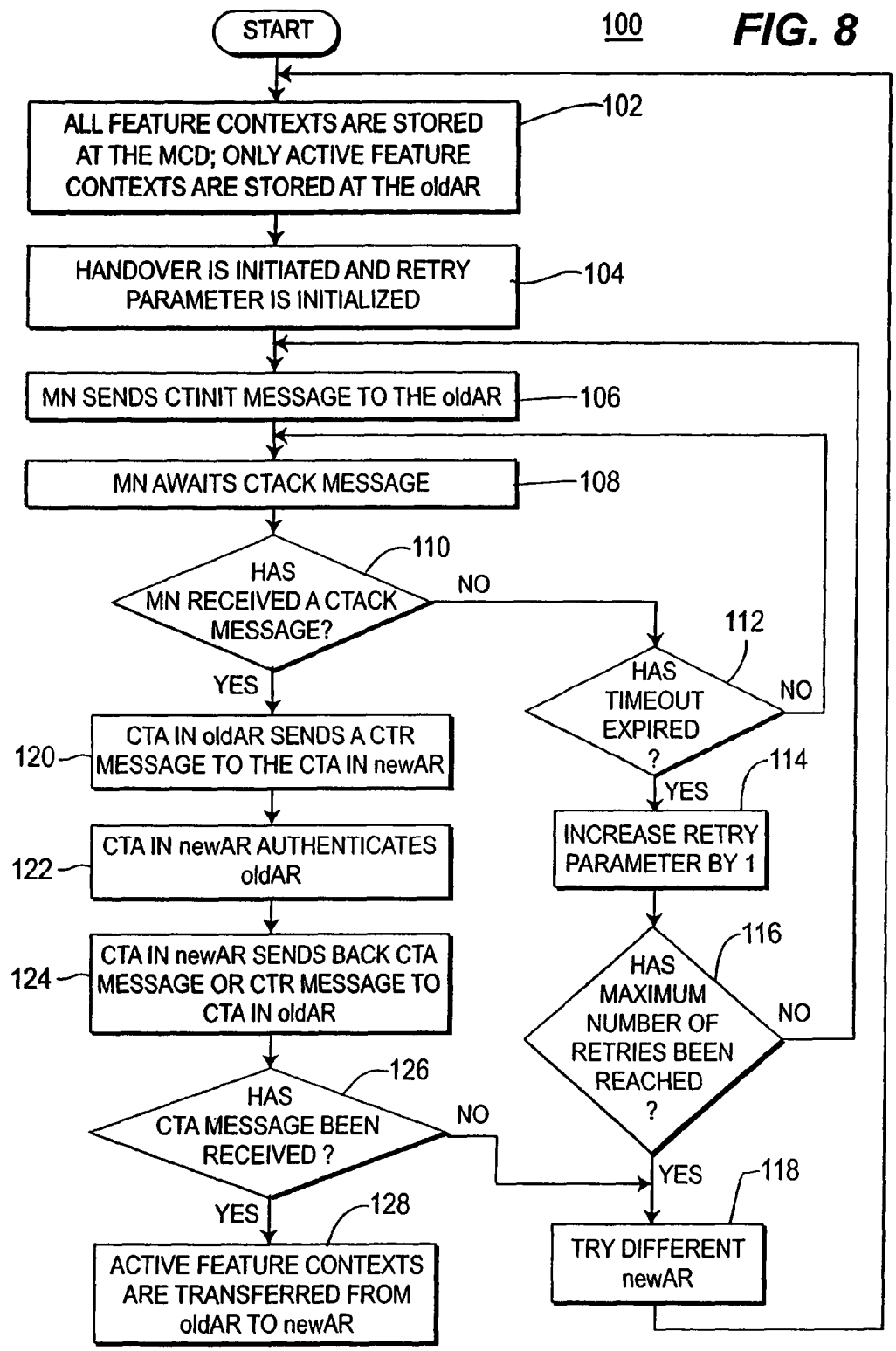

SYSTEM FOR CONTEXT TRANSFER FOR WIRELESS INTERNET DEVICES

CROSS REFERENCE TO RELATED APPLICATION(S)

This application claims priority from U.S. Provisional Patent Application No. 60/340,417, filed Dec. 14, 2001, which is incorporated by reference as if fully set forth.

FIELD OF INVENTION

The present invention relates to the field of communications. More specifically, the present invention relates to supporting microflows by the mobile Internet, and to a context transfer approach to supporting microflows.

BACKGROUND

The Internet is increasingly being used to support mobile applications. There a growing need to support many different types of microflows, including both real-time and non real-time services.

In a mobile environment, microflows emanating from a Mobile Node (MN) are characterized by a set of parameters. The parameters define a context and the resulting feature contexts may be stored within an access router (AR).

Some features are specifically defined for a particular microflow, while others are defined for all the microflows belonging to the MN. These features may be for defining the QoS state, (such as RSVP, DiffServ, COPS), maintaining robust header compression, (such as van Jacobson and GRE), and security, (such as PKI and AAA). In order to assist in preserving the network bandwidth, it is desirable to store these parameters at some node entity within the access network, instead of at the MN itself. By doing that, the overhead of processing and transmission delay from the MN to the AR is greatly reduced. This saves the transmission bandwidth through the radio link and makes the design of the MN much simpler.

The context transfer protocol is tightly integrated into the handover protocols currently developed by the IETF, such as: Fast Handovers for Mobile IPv6, Low Latency Handoffs in Mobile IPv4, and Bi-directional Edge Tunnel Handover for IPv6. It must support seamless (i.e. uninterrupted), loss-less, resumption of services after the handover is completed. Therefore, an essential requirement of context transfer is that there must be good synchronization between the handover protocol and the context transfer method, and the context transfer must be reliable.

The protocol must maintain the integrity of data during the context transfer. There must be security association between the two ARs so that they can mutually authenticate themselves prior to the transfer of context. The context transfer protocol must also minimize the amount of processing at the sending and receiving ARs, and it must complete the context transfer with a minimum number of signaling messages.

It would also be desirable for the context transfer protocol to be scalable. Scalability means that the context transfer protocol should scale with the number of participating MNs, and that it should scale with the number of feature contexts and feature contexts being transferred.

SUMMARY

The present invention is a system and method which stores all currently "active" feature contexts locally at the ARs, and stores all "inactive" feature contexts centrally in a main database. The main database can be accessed by all the ARs within the same administrative domain. When a new microflow becomes active, its active feature contexts are brought from the main database and loaded into the local directory, thus replacing any inactive feature contexts that are not needed at the time.

BRIEF DESCRIPTION OF THE DRAWING(S)

FIG. 8 is a flow diagram of a method for feature context transfer.

Figures 1, 2:
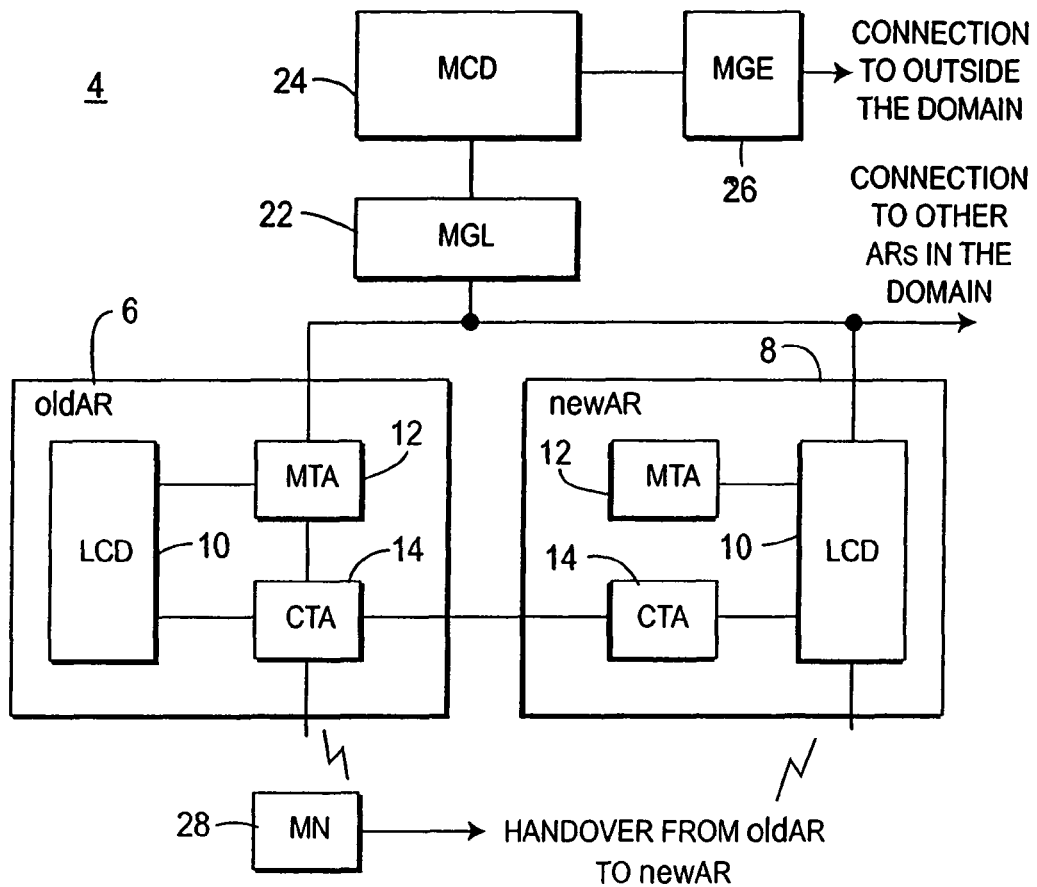
FIG. 1 is a block diagram of the architecture for performing context transfer between a pair of ARs.
FIG. 2 depicts a context transfer L3 trigger message.

Tables 1 and 2 provide an overview of the acronyms used in the figures relating to the entities and the signals, respectively.

TABLE 1

| ENTITIES | |
|---|---|
| ACRONYM | MEANING |
| LCD | Local Context Directory |
| CTA | Context Transfer Agent |
| MTA | Memory Transfer Agent |
| MN | Mobile Node |
| AR | Access Router |
| MCD | Main Context Database |
| MGL | Memory Gateway (local) |
| MGE | Memory Gateway (external) |

TABLE 2

| ENTITIES | |
|---|---|
| ACRONYM | MEANING |
| CTR | Context Transfer Request |
| CTA | Context Transfer Accept |
| CTD | Context Transfer Denied |
| CTINIT | Context Transfer Initiate |
| CTACK | Context Transfer Acknowledge |
| FCR | Feature Context Request |
| FCA | Feature Context Accept |
| FCD | Feature Context Denied |

DETAILED DESCRIPTION OF THE PREFERRED EMBODIMENT(S)

The preferred embodiment will described with reference to the drawing figures wherein like numerals represent like elements throughout.

As an overview of the present invention, feature contexts are maintained within each AR for every MN that is connected to that AR. The feature contexts define the microflows of an MN. These feature contexts may be "active" or "inactive" depending on whether or not the MN needs to make use of it at that time. If at anytime during a session an MN wishes to initiate a handover from its current AR (hereinafter "oldAR") to a different AR (hereinafter "newAR"), it sends a Context Transfer Initiate (CTINIT) message to the oldAR. This message may be in the form of a layer 2 (L2) trigger or it may be a special layer 3 (L3) packet. Included in the trigger message is the identity of the newAR to which the feature contexts are being transferred. After the oldAR has determined the identity of the newAR, it sends a Context Transfer Request (CTR) message to the newAR. The newAR may choose to accept or reject this request. If the CTR is accepted, the newAR sends back a Context Transfer Accepted (CTA) message; otherwise, it sends back a Context Transfer Denied (CTD) message to the oldAR. If the feature context transfer request is accepted, the active feature contexts for the MN are transferred from the oldAR to the newAR. If, on the other hand, the feature context transfer request is denied, then the MN attempts to find another newAR as a new target for the context transfer.

Referring to the block diagram of FIG. 1, the present invention will be described in detail. The system 4 for performing a feature context transfer between a pair of ARs (from an oldAR 6 to a newAR 8), includes a Main Contact Database (MCD) 24, a Memory Gateway (external) (MGE) 26, a Memory Gateway (local) (MGL) 22, a plurality of ARs 6, 8 and a plurality of MNs 28, (only one of which is shown in FIG. 1 for simplicity).

It should be noted that although the system 4 shown in FIG. 1 pertains to a single administrative domain, (i.e. of all the entities under the MCD 24), it would be understood by those of skill in the art, (as also shown in FIG. 1) that there are connections to other ARs within the domain under the MGL 22, and also connections outside the domain via the MGE 26.

The MCD 24 is a database that contains the feature contexts for all MNs 28 being served in the domain. This includes the feature contexts for all active and inactive microflows. The MGE 26 is a control entity that provides an interface between different Memory Transfer Agents (MTA) belonging to different domains. The MGL 22 is a control entity that provides an interface between different local MTAs belonging to the same domain. The ARs 6, 8 are control units that provide an interface to the Internet Protocol (IP) network. The ARs 6, 8 are responsible for assigning an IP address, (or any other type of address), to the MNs 28.

Each AR 6, 8 includes a Local Context Directory (LCD) 10, a Memory Transfer Agent (MTA) 12 and a Context Transfer Agent (CTA) 14. The LCD 10 maintains the list of feature contexts for active microflows for all MNs 28 associated with that particular AR 6, 8. The CTA 14 is a control entity that is responsible for establishing the contacts with the new point of attachment (i.e. the newAR 8) in order to transfer the active feature context to the newAR 8. The MTA 12 is a control entity that is responsible for transferring the context of the LCD 10 to the LCD 10 newAR 8.

The system 4 of the present invention utilizes selective transfer of feature context data. The feature contexts are separated into two categories: 1) feature contexts belonging to "active" microflows; and 2) feature contexts belonging to "inactive" microflows. As those of skill in the art would realize, an active microflow is one which is currently in progress sending traffic; whereas an inactive microflow is one which is suspended or stopped altogether. All the active feature contexts have to be available inside the LCD 10 of the AR (oldAR 6 and new AR 8), while the inactive feature contexts are stored in the MCD 24. Whenever a new microflow becomes active, its feature contexts are brought from the MCD 24 via the MGL 22 and loaded into the LCD 10, thereby overwriting any inactive feature contexts that may be present there. In accordance with the present invention, it is not necessary to store all of the feature contexts locally at the ARs 6, 8, it is only necessary to store locally the feature contexts of the active microflows. This helps to significantly reduce the size of the LCD 10 since the feature contexts for the inactive microflows can be accessed from the MCD 24 when needed. This also reduces the time required for the feature context transfer and also reduces the bandwidth and processing overhead.

The process of handover from the oldAR 6 to the newAR 8 initiates the feature context transfer process. To start the transfer of feature contexts, the MN 28 sends a "trigger" signal to the CTA 14 in the oldAR 6 through the wireless interface. This trigger signal may be in the form of a L2 trigger message, or it may be a separate IP packet.

This message is called Context Transfer Initiate (CTINIT). The CTINIT comprises an ICMP Echo Request message. The format of the CTINIT message is shown in FIG. 2. A description of the terminology used in FIG. 2 follows in Table 3:

TABLE 3

| FIELD | DESCRIPTION |
| --- | --- |
| TYPE | Echo Request - value 8 |
| CODE | CTINIT - code value 1 |
| CHECKSUM | The 16-bit one's complement of the one's complement sum of the ICMP message, starting with the ICMP Type. For computing the checksum, the checksum field is set to 0. |
| IDENTIFIER | unused, provided for future flexibility. |
| SEQUENCE NUMBER | unused, provided for future flexibility. |
| NUM ADDRS | The address of the prospective newAR. |
| ADDR ENTRY SIZE | The number of 32-bit words of information per each router address, (preferably 2). |
| LIFETIME | The maximum number of seconds that the AR addresses may be considered valid. |
| MN's IDENTITY | NAI or L2 address. |
| oldAR's IP ADDRESS | Current AR's IP address. |
| NewAR's IP ADDRESS | [i] Prospective target AR's IP address(es), (i = 1 ... NUM ADDRS): |
| Preference Level[i] | The preferability of each newAR[i] as i = 1 ... NUM ADDRS the candidate target AR, relative to other AR addresses in the same domain. A signed, two's-complement value; higher values mean more preferable. |

The CTINIT message provides a list of "target" newAR 8 along with their associated information. The associated information can change as desired by the system operator, but preferably comprises the fields shown in FIG. 2. For example, the preference level is a value assigned to each AR in the domain. The preference level may be based on any criteria set by the operator, or may be made the same for all ARs. Preferably, the preference level for each AR in the domain is different, and the present invention, will be described as such. The oldAR 6 selects the newAR 8 with the highest preference value. However, if that newAR 8 denies the CTR request, the newAR 8 the next highest preference value is targeted.

Figures 3, 4, 5, 6, 7:
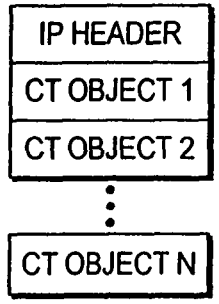
FIG. 3 depicts a context transfer L3 acknowledgement message.
FIG. 4 illustrates a ICMP Message Format for CTR, CTA and CTD.
FIG. 5 depicts the format of feature context object(s) message.
FIG. 6 illustrates format of a context transfer object.
FIG. 7 depicts a context transfer ESP message format.

After the MN 28 has transmitted the CTINIT message, it waits to receive back a Content Transfer Acknowledgement (CTACK) message. The CTACK message comprises an ICMP Echo Reply message. If no CTACK message is received within a timeout period, the MN 28 retransmits the CTINIT message. This is done repeatedly until either a CTACK is received, or a maximum count of retries has been reached, whereby the feature context transfer to that newAR 8 is abandoned and another newAR 8 is targeted. The format of a CTACK message is shown in FIG. 3. A description of the terminology used in FIG. 3 follows in Table 4:

TABLE 4

| FIELD | DESCRIPTION |
| --- | --- |
| TYPE | Echo Reply - code value 0 |
| CODE | CTACK - code value 1 |
| CHECKSUM | The 16-bit one's complement of the one's complement sum of the ICMP message, starting with the ICMP. For computing the checksum, the checksum field is set to 0. |
| IDENTIFIER | unused, provided for future flexibility. |
| SEQUENCE NUMBER | unused, provided for future flexibility. |
| MNs IDENTITY | (NAI or L2 address) |

No CODE value is currently used with the CTACK Echo Reply message. For the CTACK message, the MN's identity is echoed back to the MN 28, so that it can match it with the MN's identity previously sent with the CTINIT message.

After the CTINIT message is received, the CTA 14 in the oldAR 6 sends a Context Transfer Request (CTR) message to the CTA 14 of the newAR 8. Upon receiving the CTR message, the CTA 14 in the newAR 8 authenticates the oldAR 6.

Authentication ensures that the oldAR 6 is to be trusted and the information conveyed is correct. The authentication process is not central to the present invention and there are many such processes which are well known in the art that may be used. However one process for authentication is done by establishing a Security Association (SA) between the oldAR 6 and the newAR 8. Each SA is given a number, known as a Security Parameters Index (SPI), through which it is identified. In order for the oldAR 6 and the newAR 8 to mutually authenticate themselves, the oldAR 6 must know the SPI value of the newAR 8. Likewise, the newAR 8 must know the SPI of the oldAR 6. The oldAR 6 sends its SPI value with the payload to the newAR 8, using a normal IP routing header. The newAR 8 verifies the SA by noting the SPI, and sends back a CTA if the context transfer request is accepted. When sending the CTA message, the newAR 8 also forwards its SPI value to the oldAR 6. Thus, in a similar manner, the oldAR 6 verifies the SA by noting the SPI value of the newAR 6.

The newAR 8 sends back a Context Transfer Accepted message (CTA) if the CTR is accepted, or a Context Transfer Denied message (CTD) if the CTR is denied. If the CTR is accepted, then the feature context transfer can proceed normally, otherwise the context transfer is not permitted to proceed to that particular newAR 8.

The message formats for the CTR, CTA are also ICMP messages. CTR is an ICMP Echo Request, while CTA and CTD comprise ICMP Echo Reply. The format of the ICMP message for the CTR, CTA and CTD messages is shown in FIG. 4. A description of the terminology shown in FIG. 4 follows in Table 5:

TABLE 5

| FIELD | DESCRIPTION |
| --- | --- |
| TYPE | 8 - Echo Request, 0 - Echo Reply |
| CODE | 2 - CTR, 2 - CTA, 3 - CTD |
| CHECKSUM | The 16-bit one's complement of the one's complement sum of the ICMP message, starting with the ICMP TYPE. For computing the checksum, the checksum field is set to 0. |
| IDENTIFIER | used for matching CTRs from sending. |
| SEQUENCE NUMBER | AR with CTAs or CTDs from receiving AR. |
| MN's ADDRESS | Provided in CTR message only. This field is absent in CTA and CTD messages. |

When the CTR is accepted, and the CTA message is sent back to the oldAR 6, the transfer of all active feature contexts for the particular MN 28 from the LCD 10 in the oldAR 6 to the LCD 10 in the newAR 8 is performed. This transfer may be accomplished using any of the data transfer and handshaking protocols that one known in the art to transfer data between two entities. Several messages are exchanged between the two ARs 6, 8 in accordance to insure connectivity and authenticity as well as the information being transferred.

Preferably the active feature contexts of the MN 28 that are resident in the LCD 10 of the oldAR 6 are transferred from the oldAR 6 to the LCD 10 of newAR 8 in an ESP encapsulated IP datagram. The innermost IP datagram contains a common IP header, and following that is a set of feature context objects. The basic structure of this datagram is shown in FIG. 5.

The format of a CT object is shown in FIG. 6. The basic structure comprises a CT header and a listing of the feature context parameters. A description of the terminology used in FIG. 6 follows in Table 6:

TABLE 6

| FIELD | DESCRIPTION |
| --- | --- |
| TYPE | The type of feature context being transferred, (i.e. whether it's RSVP, iffServ, RoHc, AAA keys, etc.) The type value is unique to the specific type of feature context being transferred. |
| CODE | Within each TYPE, a number of different objects may be defined. For example, RSVP defines SENDER_TSPEC, ADSPEC and FLOWSPEC objects; DiffServ defines DSCP's to emulate PHB's in a Differentiated Services network; AAA registration keys. Thus, parameters are grouped into different sets, as indicated by the CODE values. Each particular set of parameters within a given class, is transmitted from the sending AR to the receiving AR as a separate CT object. |
| RES | unused, provided for future flexibility. |
| L | Last object transmitted. If a CT object with the L-bit set is not received within a timeout period, a suitable NAK message is sent to the sending AR. Also, if a CT object follows the CT object with the L-bit set, a similar NAK message is sent to the sending AR, indicating an error. |
| SEQUENCE NUMBER | Used for maintaining the order of transmissions of CT objects, and also for reliability purposes. If a gap in sequence number occurs, a NAK packet is sent to the sending AR, indicating the sequence number of the object that was not received. |
| NUM PARAMS | Number of feature context parameters transferred in this object. |
| LIFETIME | The maximum number of seconds that the context transfer object may be considered valid. |
| CHECKSUM | The 16-bit one's complement of the one's complement sum of the CT object, starting with the ICMP Type. For computing the checksum, the Checksum field is set to 0. |
| MN's IDENTITY | MN's NAI or L2 identifier. |
| PARAMETER(S) | List of feature context parameters. |

It should be noted that all context transfer messages between the oldAR 6 and newAR 8 are encapsulated with IPsec ESP, to handle security of data. During the establishment of sessions between the ARs, the CTR, CTA or CTD messages are represented by ICMP packets and placed in the datagram portion of the IP packet. Any feature context to be transferred between the ARs 6,8 are likewise encapsulated in standardized objects and placed in the datagram portion of the IP packet. A TCP header, ESP header and ESP trailer segments are added as shown in FIG. 7. The resulting packet is then encrypted, to preserve the privacy and integrity of its contents. An ESP authentication field is added to end of the encrypted packet, and an IPv4 routing header is added to the beginning of the packet. The routing header must be the same as the innermost IP header.

The reliability of context transfer signaling messages, (CTINIT, CTACK, CTR, CTA and CTD), is provided by the 16-bit checksum in the ICMP header. The checksum is recomputed by the newAR 8, and the resulting value is compare with the value in the checksum field of the message. Any mismatch is flagged as an error, and a NAK is returned indicating the SEQUENCE NUMBER of the erroneous message in the IDENTIFIER field. The original message is then retransmitted by the original sender.

Another source of error may be due to mismatch in the actual and computed checksum in the CT object header. If this occurs, a NAK is sent to the oldAR 6, indicating the SEQUENCE NUMBER of the erroneous CT object in the IDENTIFIER field. The NAK may be piggybacked onto another message, or sent as a separate message altogether. The resulting CT object is retransmitted as part of the same context transfer message, or as a new context transfer message.

When a new feature context is desired, a signal called Feature Context Request (FCR) is issued by the CTA 14. This message may be in the form of an ICMP datagram, including appropriate TYPE, CODE values and the identity of the MN 28. On receiving the FCR message, the MTA 14 may choose to accept (FCA) or deny (FCD) the request. These two messages may also be in the form of an ICMP datagram. The FCR may be accepted if there is sufficient space in the LCD 10 to store all the parameters associated with the feature context. If the FCR is accepted, the feature context parameters are brought from the MCD 24 into the LCD 10 in the newAR 8.

Referring to FIG. 8, a procedure 100 in accordance with the present invention is shown. The procedure 100 transfers active feature context from an oldAR 6 to a newAR 8. The procedure 100 starts with all feature contexts (both active and inactive) being stored at the MCD 24, but only active feature context being stored at the oldAR 6 (step 102). Once handover is initiated, a retry parameter is initialized (step 104). The retry parameter keeps track of the number of retries the MN 28 has made in order to send the CTACK message. The MN 28 sends the CTINIT message to the oldAR 6 (step 106) and awaits a CTACK message (step 108). The MN 28 determines whether it has received a CTACK message (step 110). If the MN 28 has not received a CTACK message then the MN determines whether a timeout period has expired (step 112). If the timeout period has not expired, the MN 28 returns to step 108 to await the CTACK message. If the timeout period has expired, the retry parameter is increased by 1 (step 114) and the MN 28 determines whether the maximum number of retries has been reached (step 116). If the maximum number of retries has not been reached the MN 28 returns to step 106 and resends the CTINIT message. If the maximum number of retries has been reached, the feature context transfer to that newAR 8 is abandoned and another newAR 8 may be targeted (step 118).

Once the MN 28 determines that it has received a CTACK message as determined at step 110, the CTA 14 in the oldAR 6 sends a CTR message to the CTA 14 in the newAR 8 (step 120). The CTA 14 in the new AR 8 authenticates the oldAR 6 (step 122) and the CTA 14 in the newAR 8 sends back to the CTA 14 in the oldAR 8 a CTA message if accepted, and sends back a CTD message if denied (step 124).

If a CTA message has been received by the MN 28 (step 126), only the active feature context are transferred from the oldAR 6 to the newAR 8. If the CTA message has not been received by the MN 28 as determined at step 126, step 118 is entered whereby a different newAR 8 is targeted for context transfer.

Although the present invention is directed to a feature context transfer protocol for context transfers between an oldAR 6 and a newAR 8 within the same domain, it should be understood by those of skill in the art that in the event an MN 28 handoffs to a newAR in a different administrative domain, the process of transferring feature contexts between the LCDs 10 is also the same as hereinbefore described. However, in addition to the transfer of the active feature contexts between the LCDs, the inactive feature contexts are moved as well, from the current MCD 24 to a new MCD in the new domain. The MCD 24 transfer is accomplished via the MGE 26.

What is claimed is:

1. At a first access router (AR), a method for transferring feature context comprising:
   storing active feature contexts related to an active microflow for a connected mobile node;
   receiving a Context Transfer Initiate (CITNIT) message from the mobile node, the CITNIT message comprising a list of potential new ARs, including at least a second AR, and a preference level for each potential new AR serving as the basis for selection of a new AR different from the first AR;
   receiving a Context Transfer message from the mobile node to transfer the active feature contexts to a second AR; and
   forwarding only the active feature contexts to the second AR.

2. The method of claim 1, further comprising:
   determining an identity of the second AR.

3. The method of claim 1, further comprising receiving a context transfer accepted message from the second AR.

4. A first access router (AR) comprising:
   a local database for storing active feature contexts related to an active microflow;
   a receiving component configured to receive a message from a mobile node to transfer the active feature contexts to a second AR;
   receiving a Context Transfer Initiate (CITNIT) message from the mobile node, the CITNIT message comprising a list of potential new ARs, including at least another AR, and a preference level for each potential new AR serving as the basis for selection of a new AR different from the first AR; and
   a transfer agent for forwarding only the active feature context to the another AR.

5. The access router of claim 4, wherein the transfer agent determines an identity of the another AR.

6. The access router of claim 4, wherein the local database further stores inactive feature contexts.

* * * * *